United States Patent [19]
Kinoshita et al.

[11] Patent Number: 6,150,786
[45] Date of Patent: Nov. 21, 2000

[54] CONTROLLER FOR INDUSTRIAL MACHINE

[75] Inventors: Jiro Kinoshita; Yutaka Muraoka, both of Minamitsuru-gun, Japan

[73] Assignee: Fanuc Ltd., Yamanashi, Japan

[21] Appl. No.: 09/199,275

[22] Filed: Nov. 25, 1998

[30] Foreign Application Priority Data

Nov. 26, 1997 [JP] Japan .................................. 9-339458

[51] Int. Cl.[7] .............................. G05B 9/03; G05B 23/02
[52] U.S. Cl. ........................... 318/564; 318/565; 318/625
[58] Field of Search .................................. 318/563, 564, 318/565, 625

[56] References Cited

U.S. PATENT DOCUMENTS

| | | | |
|---|---|---|---|
| 3,149,272 | 9/1964 | Dendy | 318/564 |
| 3,309,588 | 3/1967 | Martin et al. | 318/564 |
| 4,398,242 | 8/1983 | Buus | 318/564 X |
| 4,587,470 | 5/1986 | Yamawaki | 318/564 |
| 4,902,947 | 2/1990 | Ako | 318/563 |
| 5,043,648 | 8/1991 | Strenzke | 318/632 |
| 5,694,014 | 12/1997 | Hegg et al. | 318/564 |

FOREIGN PATENT DOCUMENTS 03-113507  5/1991  Japan .

*Primary Examiner*—Bentsu Ro
*Attorney, Agent, or Firm*—Staas & Halsey LLP

[57] ABSTRACT

A controller for an industrial machine capable of monitoring a receiving circuit for receiving position information. A receiving circuit and an additional receiving circuit receive the same position information from a detector, and a monitoring circuit monitors a receiving state of the receiving circuit using position information received by the additional receiving circuit. A plurality of receiving circuits may be provided for respectively receiving different position information, and a plurality of additional receiving circuits and a plurality of monitoring circuits may be provided in a manner such that each additional receiving circuit and each monitoring circuit is associated with each receiving circuit. A single additional receiving circuit and a single monitoring circuit may be common to a plurality of receiving circuits.

10 Claims, 8 Drawing Sheets

CONTROLLER FOR INDUSTRIAL MACHINE

BACKGROUND OF THE INVENTION

1. Field of the Invention

The present invention relates to a controller for an industrial machine such as a machine tool or a robot, and specifically to a receiving circuit to which position information is input from a position detector.

2. Description of the Related Art

In a controller for an industrial machine such as a numerical control device or a robot controller, position control is performed by feeding back position information and comparing it with position command information. In such position control, the position information obtained from a position detector provided at driving means such as a motor is received by a receiving circuit and signal processing is performed by a CPU provided in the controller.

FIG. 7 is a schematic block diagram showing a control system of a numerical controller. In FIG. 7, reference numeral 1a denotes a host processor for controlling the numerical controller. The host processor 1a performs interpolation, transformation of coordinate values into a rotation angle for each axis, inverse transformation, and distribution of a position command to each axis. Reference numeral 1b is a common RAM which is an intermediary through which information is transmitted between the host processor 1a and processors in axis control circuits 2x, 2y, 2z which are each formed by a digital servo circuit or the like. The common RAM 1b transmits data such as a position command or the like written by the host processor 1a to the processors in the axis control circuits 2x, 2y, 2z, and transmits alarm information or the like written by any of the processors in the axis control circuits 2x, 2y, 2z to the host processor 1a. The axis control circuits 2x, 2y, 2z are digital servo circuits which are each composed of a processor, a RAM, a ROM and the like, and perform axis position control of servomotors provided for individual axes. Reference numerals 7x, 7y, 7z denote servo amplifiers which can each be formed by a transistor inverter or the like. Sign M denotes a servomotor. Position and speed of each servomotor M can be detected by each detector 6. Detected position information is fed back to the axis control circuits 2x, 2y, 2z.

In a conventional numerical controller, for each axis, position information fed back from the detector is received by the receiving circuit 4x, 4y or 4z provided in the numerical controller 10, and fed back to the axis control circuit 2x, 2y or 2z. Based on this position information and a position command coming from the host processor 1a, position deviation is obtained, and a control signal based on this position deviation is provided to the servo amplifier 7 in order to perform position control.

In the conventional numerical controller, for each axis, position information coming from the detector is received by a single receiving circuit. The problem with this case is that if an abnormality happens to the receiving means including the, receiving circuit, it becomes difficult to receive position information from the detector.

FIG. 8 is a diagram for explaining feedback of position information in the conventional numerical controller. Here, illustration is made only for a single axis. In FIG. 8, the numerical controller 10 receives position information from the detector 6 by a single receiving circuit 4 and feeds back the position information to the axis control circuit 2. In this arrangement, if an abnormality happens to the receiving circuit 4, correct position information is not fed back, so that position control is not performed normally. For example, if position information is not output from the receiving circuit 4, position control by the axis control circuit 2 is difficult to perform.

SUMMARY OF THE INVENTION

An object of the present invention is to provide a controller capable of monitoring receiving means to which position information is input.

A controller of the present invention has receiving means for receiving position information from an industrial machine, additional receiving means provided independently of the receiving means for receiving the same position information as the receiving means receives, and monitoring means for monitoring the receiving means based on position information received by the additional receiving means.

The receiving means is provided in a numerical controller, and includes a receiving circuit, signal lines and the like. The receiving means is connected to a source of position information such as a detector through an input/output terminal provided at the numerical controller, and receives position information. Position information is provided in the form of a signal indicating position, a motion amount and the like of a motor or a movable body. Such position information can be obtained from a detector such as an encoder, a scale or the like.

The receiving means and the additional receiving means receive the same position information from a detector or the like. The monitoring means monitors the receiving means based on position information which the additional receiving means receives.

A plurality of receiving means may be provided for respectively receiving different position information, and a plurality of additional receiving means and a plurality of monitoring means may be provided in a manner such that each of additional receiving means and each of monitoring means are associated with each receiving means. In this arrangement, each receiving means is monitored by its associated monitoring means. It is also possible to provide a single additional receiving means and a single monitoring means common to a plurality of receiving means for receiving different position information.

The monitoring means monitors the receiving means based on a comparison between a position command generated in the controller and the received position information. The comparison between a position command and position information includes a comparison between a deviation of the position information from the position command and a predetermined value. The value can be arbitrarily predetermined for each axis to be subjected to position control.

The monitoring means determines abnormalities of the receiving means from a result of the comparison and informs a processor provided in the controller or an external device of the abnormality.

The position information may be input to the receiving means through a receiving circuit connected to a position detector or through communication means connected to a servo amplifier. The communication means connected to a servo amplifier can be provided in the form of signal lines which connect the numerical controller and the servo amplifier. Therefore, existing signal lines connected to the numerical controller can be utilized for this purpose. What is advantageous with this case is that it is not necessary to provide a new connecting port at the numerical controller.

The receiving means and the monitoring means can be provided in the form of software as well as in the form of hardware.

DETAILED DESCRIPTION OF THE PREFERRED EMBODIMENTS

Figure 1:
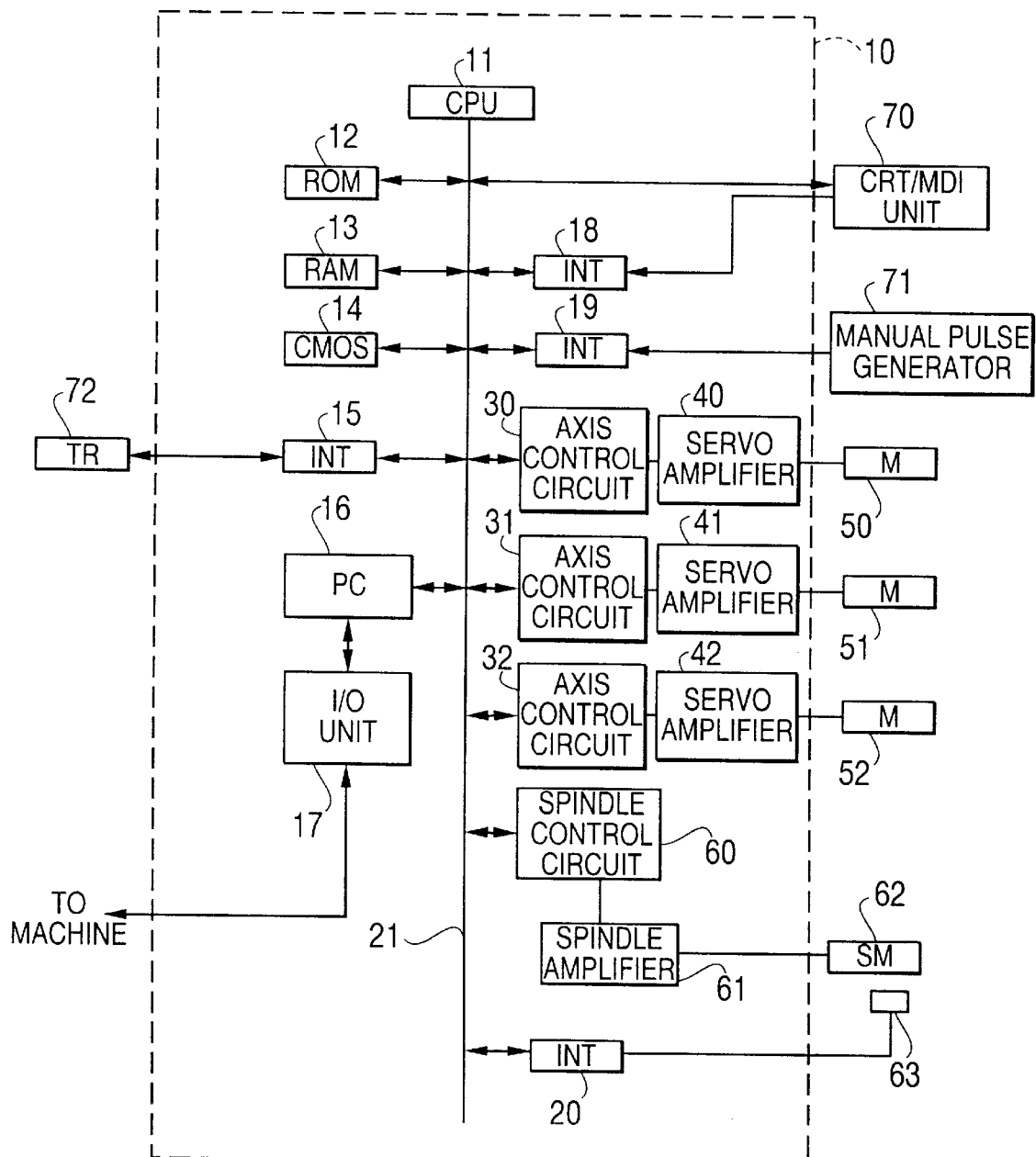
FIG. 1 is a block diagram showing schematic structure of a numerical controller according to the present invention.

FIG. 1 shows a schematic structure of a numerical controller as an example of a controller according to the present invention. A processor 11 is a processor for controlling a numerical controller 10 generally. The processor 11 reads, through a bus 21, system programs stored in a ROM 12 and controls the numerical controller 10 generally in accordance with the system programs. In a RAM 13 are stored temporary calculation data, display data, various data input by an operator through a CRT/MDI unit 70, and the like. A CMOS memory 14 is a non-volatile memory which is backed up by a battery (not shown) and holds its state of memory even if power supply for the numerical controller 10 goes off. An operation program read through an interface 15 or an operation program input through the CRT/MDI unit 70 is stored in the CMOS memory 14. Various system programs for performing processing in an edit mode, which is necessary for preparing and editing operation programs and processing in a regenerative mode which is for automatic operation, are stored in advance in the ROM 12.

The interface 15 is an interface for external apparatuses connectable to the numerical controller 10. An external apparatus 72 such as input/output means or an external memory is connected to the interface 15. It is possible to read operation programs or the like from the input/output means or the external memory and to output operation programs edited in the numerical controller 10 to the input/output means or the external memory.

A PC (programmable controller) 16 controls auxiliary devices of a machine, for example, actuators such as a robot hand for changing tools in accordance with a sequence program provided in the numerical control device 10. For example, M functions (miscellaneous functions), S functions (spindle speed functions) and T functions (tool functions) specified in the operation program are converted to signals required on the auxiliary device side in accordance with the sequence programs, and output through an I/O unit 17 to the auxiliary device side. Auxiliary devices such as various actuators operate based on the output signals. The PC 16 further receives signals coming from limit switches provided at a machine tool body and on the auxiliary device side and signals coming from various switches on an operating panel provided to the machine tool body, processes those signals as required, and transmits them to the processor 11.

Image signals such as data about the current position of each axis of the machine tool, alarm, parameters and image data are transmitted to the CRT/MDI unit 70 and displayed on a display of the CRT/MDI unit 70. The CRT/MDI unit 70 is a manual data input device provided with a display, a keyboard and the like. An interface 18 receives data from the keyboard of the CRT/MDI unit 70 and transmits the data to the processor 11. An interface 19 is connected to a manual pulse generator 71, and receives a pulse from the manual pulse generator 71. The manual pulse generator 71 is mounted on the operating panel of the machine tool body, and used for controlling each axis with a distributed pulse based on manual operation to thereby position movable portions of the machine tool precisely.

Axis control circuits 30 to 32 receive move commands for individual axes from the processor 11 and output the move commands for the individual axes to servo amplifiers 40 to 42. Receiving the move commands, the servo amplifiers 40 to 42 drive servomotors 50 to 52 for the individual axes of the machine tool. Here, the servo motors 50, 51, 52 are used to drive linear motion axes X, Y, Z provided for moving a table, respectively. One of the servomotors 50 to 52 or an additional servomotor (not shown) other than the servomotors 50 to 52 is used to drive a first rotation axis B and a second rotation axis C of a rotary head. Each of the servomotors 50 to 52 for the individual axes has a pulse coder provided therein for position detection, and a position signal from the pulse coder is fed back in the form of a pulse train. In some cases, a linear scale can be used as a position detector. It is possible to generate speed information by transforming the pulse train. In FIG. 1, feedback of position signals and speed feedback are not indicated.

A spindle control circuit 60 receives a spindle rotation command for the machine tool, and outputs a spindle speed command to a spindle amplifier 61. Receiving the spindle speed command, the spindle amplifier 61 makes a spindle motor 62 of the machine tool rotate at a specified cutting rotation speed. The spindle motor 62 is connected through toothed gears or a belt to a position coder 63. The position coder 63 outputs a feedback pulse synchronized with the rotation of a spindle. The feedback pulse coming through an interface 20 is read by the processor 11.

With reference to FIGS. 2 to 6, embodiments of the numerical controller according to the present invention will be explained below. In a schematic structure of a control system of the numerical controller according to the present invention, a feedback system composed of axis control circuits, servo amplifiers, motors, detectors and receiving circuits has structure similar to that shown by the schematic block diagram of FIG. 7. In the present invention, an arrangement related to additional receiving circuits for monitoring the receiving means is added to such structure. In the following explanation, description of the part of structure shown in FIG. 7 will be omitted. It is to be noted that FIGS. 2, 3, 5 and 6 relate to an example where three axes, that is, x, y, z axes are to be controlled.

Figure 2:
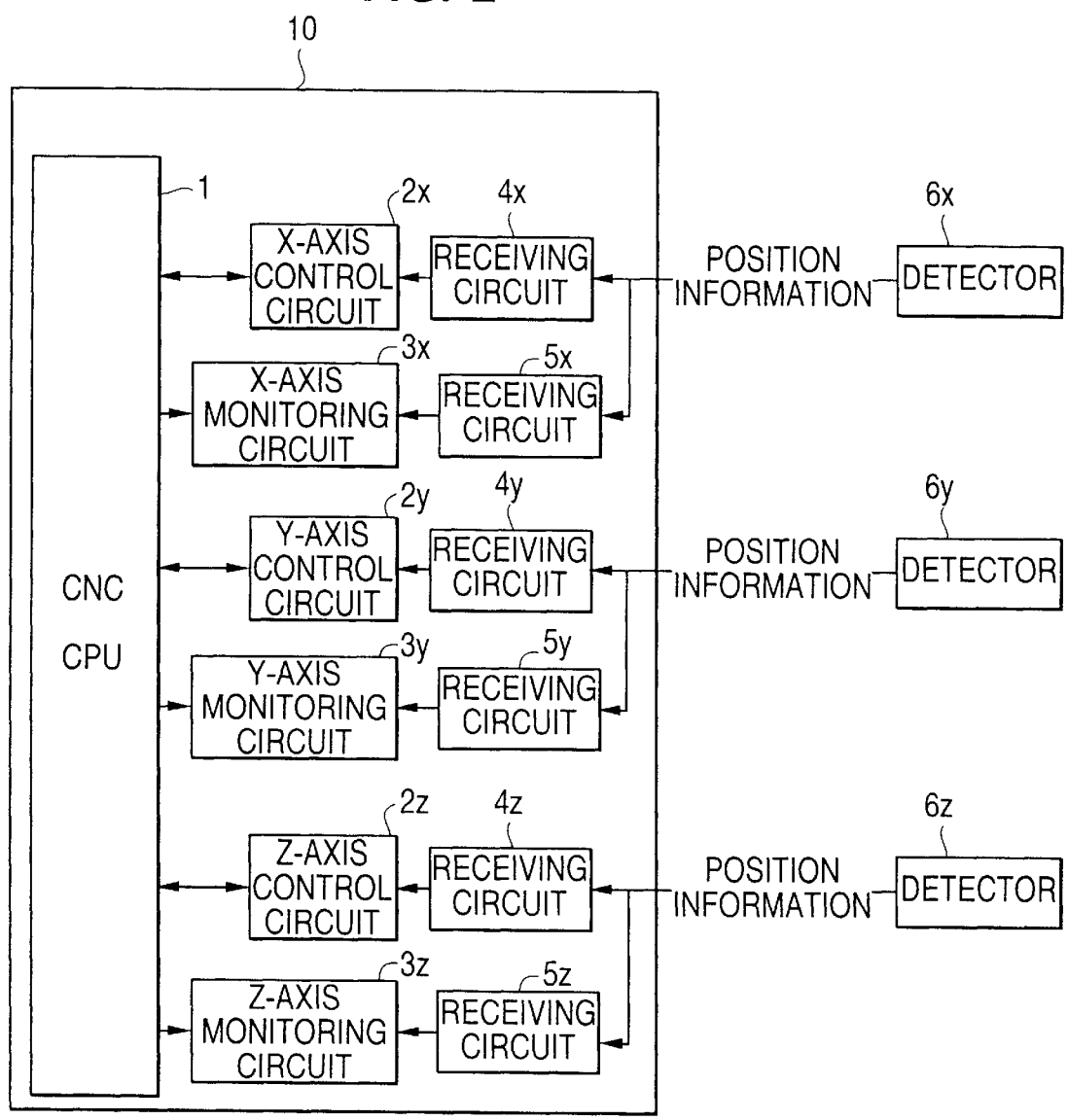
FIG. 2 is a block diagram showing a summary of a numerical controller according to a first embodiment of the present invention.

FIG. 2 is a schematic block diagram for explaining a summary of a first embodiment of a numerical controller according to the present invention.

In FIG. 2, a control section 1 is a control section for controlling a numerical controller 10. The control section 1 transmits position commands to axis control circuits (x axis control circuit 2x, y axis control circuit 2y, z axis control circuit 2z). The axis control circuits 2x, 2y, 2x receive position information about the individual axes from detectors 6x, 6y, 6z through receiving circuits 4x, 4y, 4z, respectively, and thereby perform position control.

In the present embodiment, in addition to the receiving circuits 4x, 4y, 4z, receiving circuits 5x, 5y, 5z, for receiving the same position information as the receiving circuits 4x, 4y, 4z receive, are provided independent of the receiving circuits 4x, 4y, 4z. The receiving circuits 5x, 5y, 5z are components for monitoring the receiving circuits 4x, 4y, 4z.

Monitoring circuits 3x, 3y, 3z are monitoring means which receive position information from the receiving circuits 5x, 5y, 5z and monitor the receiving circuits 4x, 4y, 4z. The monitoring circuits 3x, 3y, 3z compare position information received by the receiving circuits 5x, 5y, 5z and position commands from the control section 1. The receiving circuits 5x, 5y, 5z and the monitoring circuits 3x, 3y, 3z are provided mainly for monitoring the receiving circuits 4x, 4y, 4z, not for controlling the individual axes. The individual axes are controlled by the axis control circuits 2x, 2y, 2z.

When the monitoring circuits 3x, 3y, 3z compare position commands and position information and detect abnormalities of the receiving circuits, the monitoring circuits 3x, 3y, 3z can transmit an abnormality signal to an external device or the control section 1 of the numerical controller to deal with the abnormality. In FIG. 2, output of an abnormality signal is not indicated.

The monitoring circuits 3 can be provided as independent circuits in the numerical controller 10, or alternatively, integrated into the control section 1. In the latter case, processing is performed by a CPU provided in the control section 1.

Figure 3:
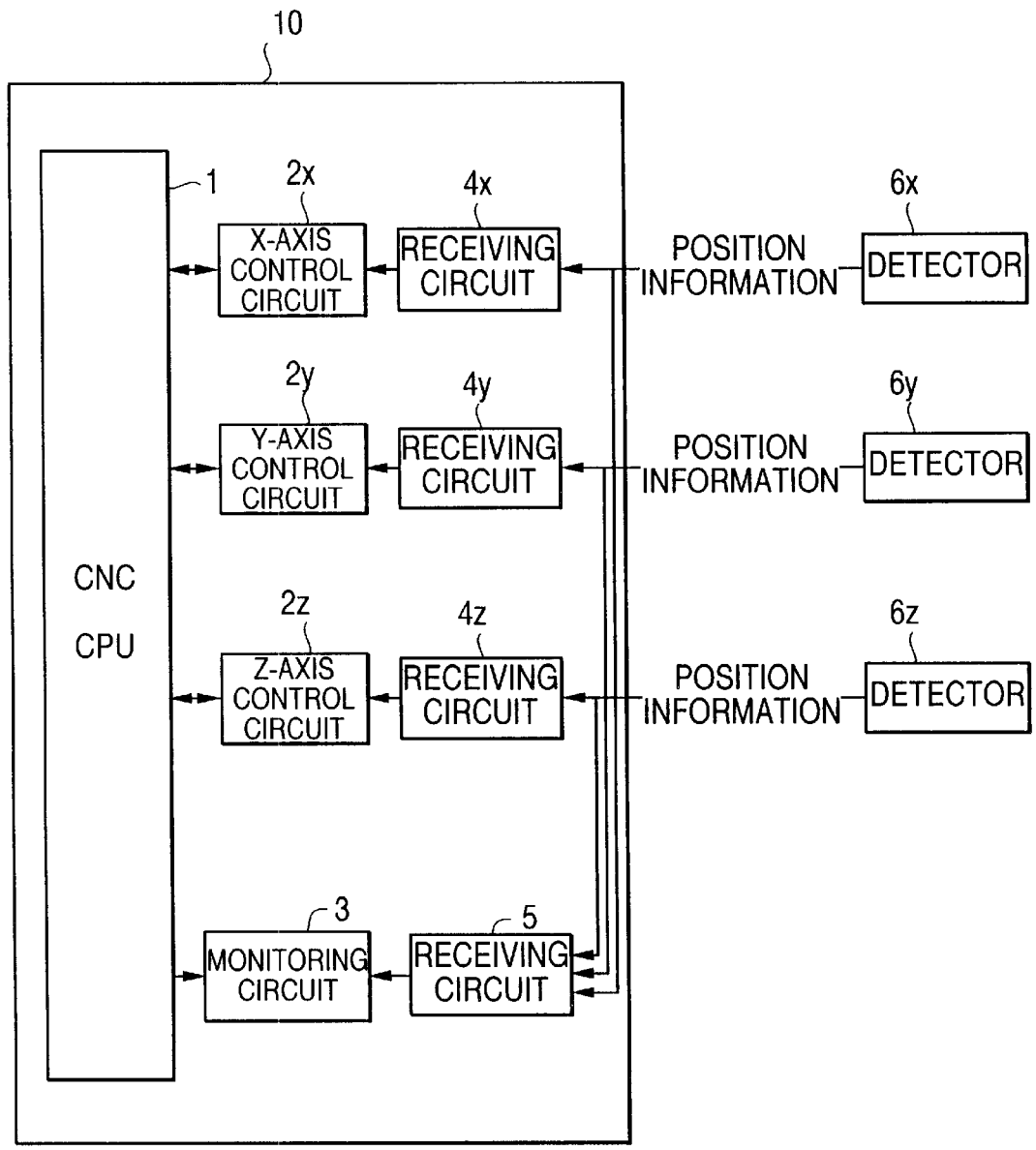
FIG. 3 is a block diagram showing a summary of a numerical controller according to a second embodiment of the present invention.

FIG. 3 is a schematic block diagram for explaining a second embodiment of a numerical controller according to the present invention. In the second embodiment, each receiving circuit is provided for each axis to obtain position information about each axis, instead of providing two receiving circuits for each axis as in the first embodiment.

In FIG. 3, as in the first embodiment, a control section 1 transmits position commands to axis control circuits 2x, 2y, 2z. Each axis control circuit 2 receives position information about each axis from each detector 6x, 6y, 6z through each receiving circuit 4x, 4y, 4z, and thereby performs position control.

In the second embodiment, a receiving circuit 5 is provided in addition to the receiving circuits 4x, 4y, 4z. The receiving circuit 5 is a circuit which receives position information from the detectors 6x, 6y, 6z, and is provided independent of the receiving circuits 4x, 4y, 4z. Here, the receiving circuit 5 is a component for monitoring the receiving circuits 4x, 4y, 4z.

A monitoring circuit 3 is monitoring means which receives position information about each axis from the receiving circuit 5, and monitors each of the receiving circuits 4x, 4y, 4z. The monitoring circuit 3 compares position information about each axis received by the receiving circuit 5 and a position command for each axis coming from the control section 1. The receiving circuit 5 and the monitoring circuit 3 are provided for monitoring the receiving circuits 4x, 4y, 4z, not for controlling the individual axes. The individual axes are controlled by the axis control circuits 2x, 2y, 2z.

When the monitoring circuit 3 compares position commands and position information and detects abnormalities of the receiving circuits, the monitoring circuit 3 can transmit an abnormality signal to an external device or the control section 1 of the numerical controller to deal with the abnormality. In FIG. 3, output of an abnormality signal is not indicated. The monitoring circuit 3 can be provided as an independent circuit in the numerical controller 10, or alternatively, integrated into the control section 1. In the latter case, processing is performed by a CPU provided in the control section 1.

Figure 4:
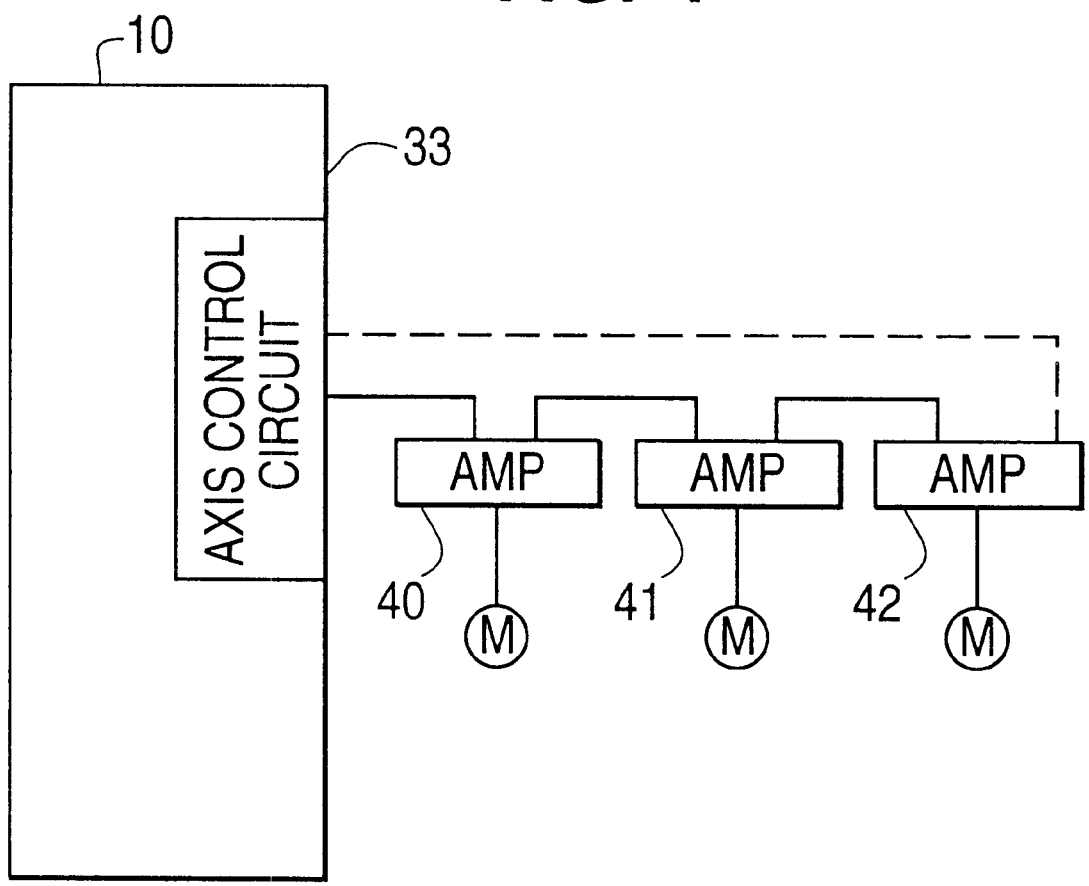
FIG. 4 is a block diagram showing how to link amplifying circuits to a numerical controller.

FIG. 4 shows how to link amplifying circuits 40, 41, 42 such as servo amplifiers to the numerical controller 10. The numerical controller 10 has an axis control circuit 33 which is connected to the amplifying circuits 40 to 42 and outputs commands for the individual axes to the amplifying circuits 40, 41, 42. The numerical controller 10 obtains servo information from the amplifying circuits 40 to 42 through the axis control circuit 33.

Figure 5:
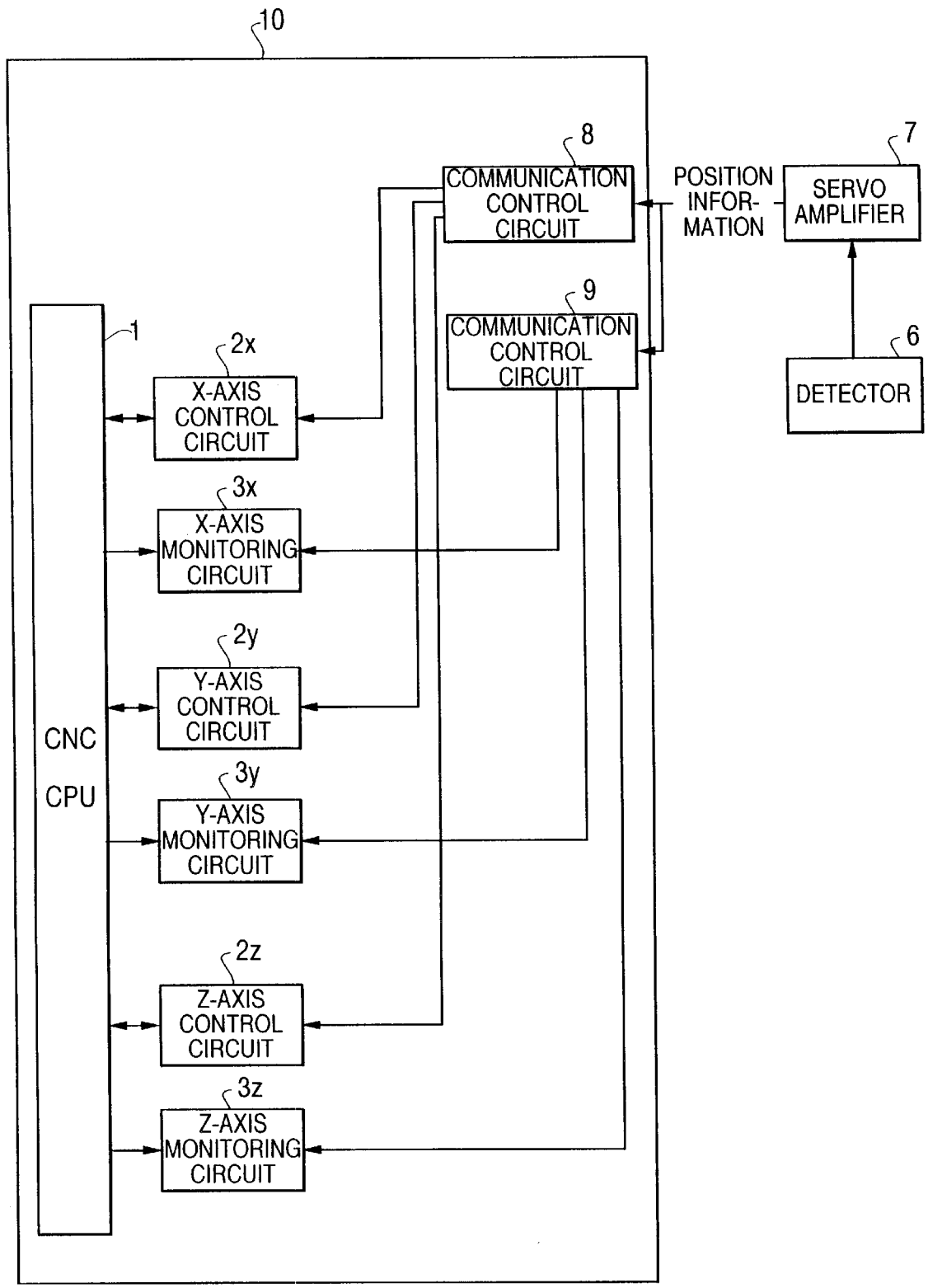
FIG. 5 is a block diagram showing a summary of a numerical controller according to a third embodiment of the present invention.
Figure 6:
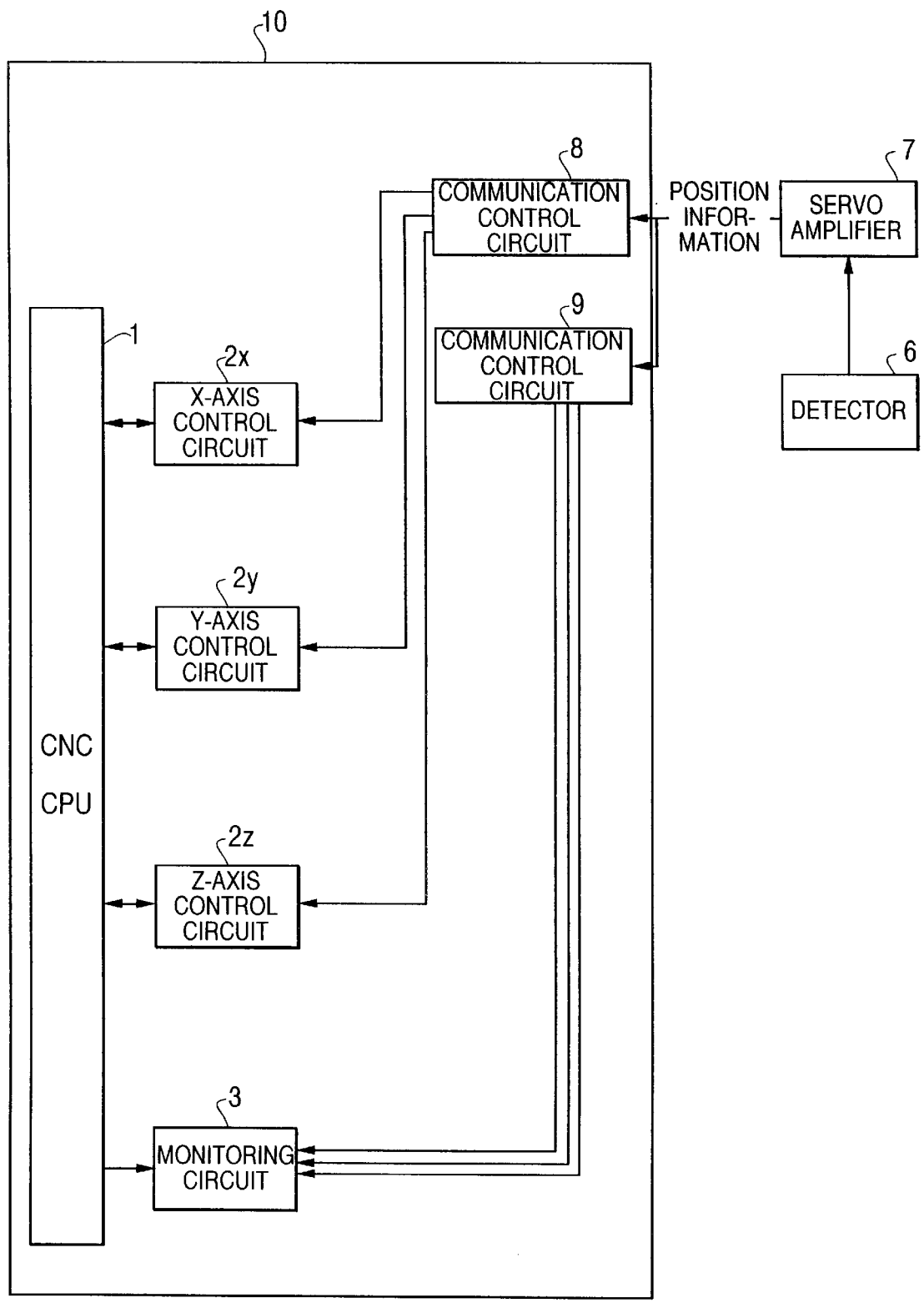
FIG. 6 is a block diagram showing a summary of a numerical controller according to a fourth embodiment of the present invention.
Figure 7:
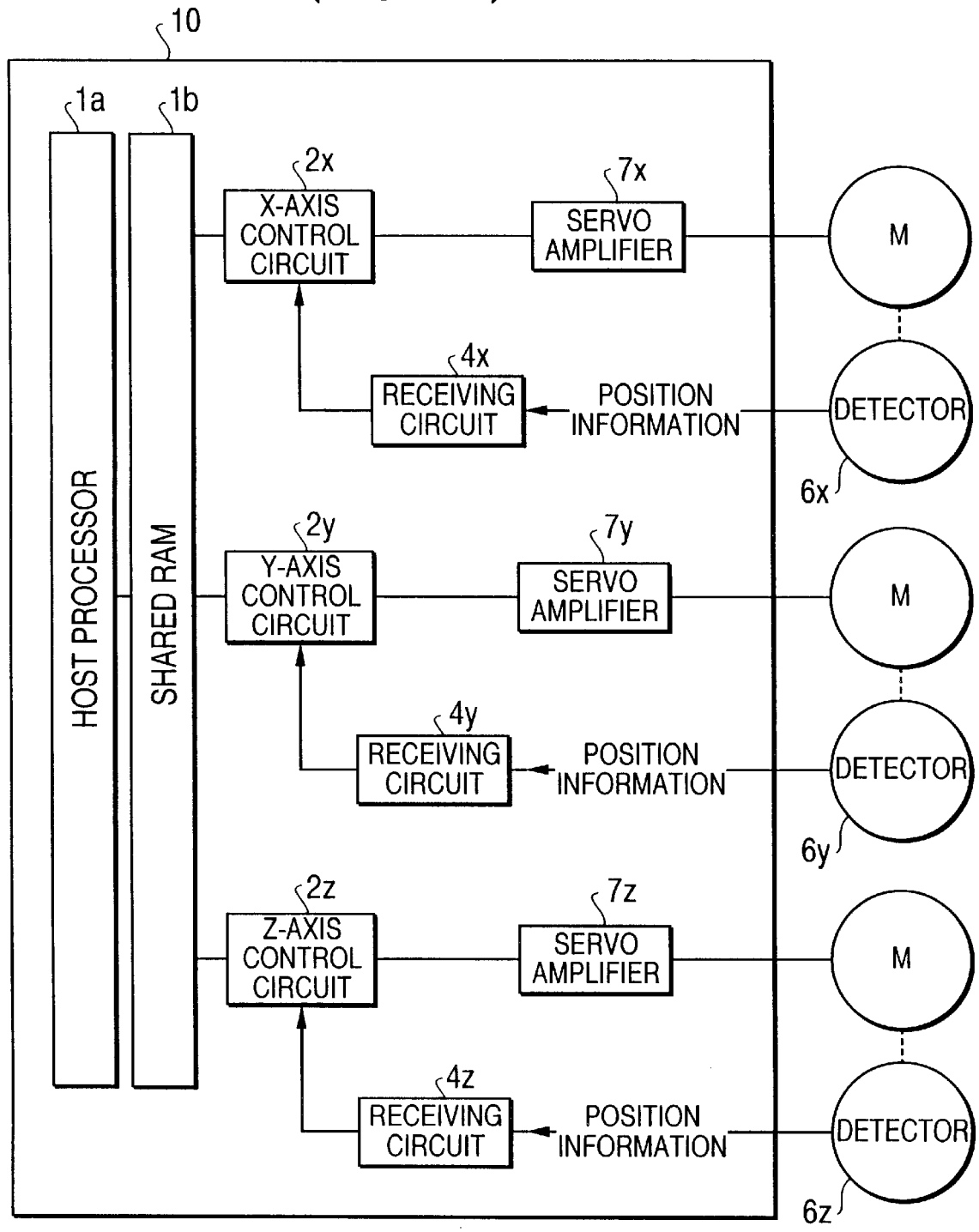
FIG. 7 is a block diagram showing a control system of a conventional numerical controller.
Figure 8:
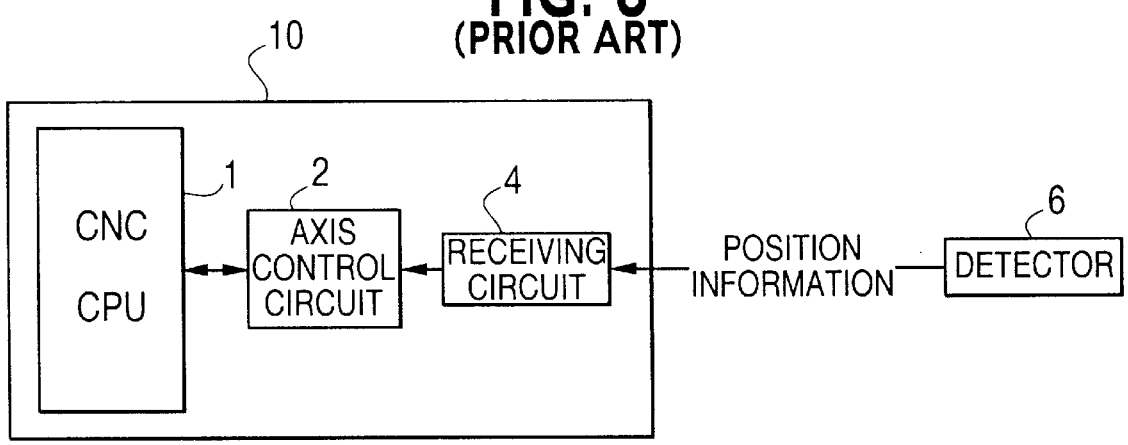
FIG. 8 is a block diagram showing feedback of position information in a conventional numerical controller.

In third and fourth embodiments shown in FIGS. 5 and 6, position information is input to the numerical controller 10 side utilizing signal lines used for the linkage shown in FIG. 4. In such arrangement, since machine information can be input using existing signal lines, preparation of new signal lines and work for connecting such new signal lines to the numerical controller can be dispensed with.

FIG. 5 is a schematic block diagram for explaining a third embodiment of a numerical controller according to the present invention. In the third embodiment shown in FIG. 5, in order to input position information from a detector 6 to a numerical controller 10, communication control circuits 8, 9 are provided to signal lines which connect a servo amplifier 7 and axis control circuits. The communication control circuit 8 is provided for inputting position information to axis control circuits 2x, 2y, 2z for controlling individual axes, and corresponds to the receiving circuits 4x, 4y, 4z in the preceding embodiments. The communication control circuit 9 is provided for monitoring the communication control circuit 8, and corresponds to the receiving circuits 5x, 5y, 5z in the preceding embodiment.

In FIG. 5, a control section 1 is a control section for controlling the numerical controller 10. The control section 1 transmits position commands to the axis control circuits 2x, 2y, 2z. The axis control circuits 2x, 2y, 2z receive, through the communication control circuit 8, position information about the individual axes which is transmitted from the detector 6 though the servo amplifier 7, and thereby perform position control.

The numerical controller according to the present invention has, in addition to the communication control circuit 8, a communication control circuit 9 which is provided independent of the communication control circuit 8 and receives the same position information as the communication control circuit 8 receives. Here, the communication control circuit 9 is a component for monitoring the communication control circuit 8.

Monitoring circuits 3x, 3y, 3z are monitoring means which receive position information from the communication control circuit 9 and monitor the communication circuit 8. The monitoring circuits 3x, 3y, 3z compare position information received by the communication control circuit 9 and position commands coming from the control section 1. Each of the communication control circuits 8, 9 has a function of dividing position information according to the individual axes and transmitting the divided information to the individual axis control circuits 2x, 2y, 2z and to the individual monitoring circuits 3x, 3y, 3z.

The communication control circuit 9 and the monitoring circuits 3x, 3y, 3z are provided mainly for monitoring the communication control circuit 8, not for controlling the individual axes. The individual axes are controlled by the axis control circuits 2x, 2y, 2z.

When the monitoring circuits 3x, 3y, 3z compare position information and position commands and detect abnormalities of the receiving circuits, the monitoring circuits 3x, 3y, 3z can transmit an abnormality signal to an external device or the control section 1 of the numerical controller to deal with the abnormality. In FIG. 5, output of an abnormality signal is not indicated. The monitoring circuits 3x, 3y, 3z may be provided as independent circuits in the numerical controller 10, or alternatively, integrated into the control section 1. In the latter case, processing is performed by a CPU provided in the control section 1.

FIG. 6 is a schematic block diagram for explaining a fourth embodiment of a numerical controller according to the present invention. In the fourth embodiment, a single monitoring circuit is provided in place of the individual monitoring circuits in the above described third embodiment.

In FIG. 6, as in the third embodiment, a control section 1 transmits position commands to axis control circuits 2x, 2y, 2z. The axis control circuits 2x, 2y, 2z receive, through a communication control circuit 8, position information about individual axes from a detector 6, and thereby perform position control.

Same as in the third embodiment, the fourth embodiment has a communication control circuit 9 in addition to the communication control circuit 8. The communication control circuit 9 is a circuit which receives position information from the detector 6 and is provided independent of the communication control circuit 8. Here, the communication control circuit 9 is a component for monitoring the communication control circuit 8.

A monitoring circuit 3 is monitoring means which receives position information about the individual axes from the communication control circuit 9 and monitors the communication control circuit 8. The monitoring circuit 3 compares position information about the individual axes received by the communication control circuit 9 and position commands for the individual axes coming from the control section 1. Each of the communication control circuits 8, 9 has a function of dividing position information according to the individual axes and transmitting the divided information to the individual axis control circuits 2x, 2y, 2z and to the monitoring circuit 3.

The communication control circuit 9 and the monitoring circuit 3 are provided mainly for monitoring the communication control circuit 8, not for controlling the individual axes. The individual axes are controlled by the axis control circuits 2x, 2y, 2z.

When the monitoring circuit 3 compares position information and position commands and detects abnormality of the receiving circuits, the monitoring circuit 3 can transmit an abnormality signal to an external device or the control section 1 of the numerical controller to deal with the abnormality. In FIG. 6, output of an abnormality signal is not indicated. The monitoring circuit 3 may be provided as an independent circuit in the numerical controller 10, or alternatively, integrated into the control section 1. In the latter case, processing is performed by a CPU provided in the control section 1.

The above described embodiments 1 to 4 can be arranged such that the monitoring circuit obtains deviation of position information from position commands coming from the control section 1, compares the obtained deviation with a predetermined value, and, if the obtained deviation exceeds the predetermined value, outputs an abnormality signal. Such values can be predetermined to be different according to the individual axes.

According to the present invention, a plurality of receiving circuits for receiving position information are provided, and position information received by such receiving circuits and position commands are compared to thereby monitor the receiving circuits. If the numerical controller is arranged such that position information is received through lines of amplifying circuits for servo amplifiers to be connected to the numerical controller, provision of new lines to the numerical controller can be dispensed with.

What is claimed is:

1. A controller for performing position control of an industrial machine, comprising:
    a receiving unit receiving position information from a position detector of the industrial machine and transmitting the position information to an axis control unit;
    an additional receiving unit provided independent of said receiving unit, receiving the same position information as said receiving unit receives; and
    a monitoring unit monitoring said receiving unit based on the position information received by said monitoring unit from said additional receiving unit.

2. The controller according to claim 1, wherein said monitoring unit monitors said receiving unit based on a comparison between a position command generated in the controller and the position information.

3. The controller according to claim 2, wherein the comparison between the position command and the position information includes a comparison between a deviation of the position information from the position command and a predetermined value.

4. The controller according to claim 2, wherein said monitoring unit determines abnormality of said receiving unit by a result of the comparison and informs a processor provided in the controller or an external device of the abnormality.

5. The controller according to claim 1, wherein said receiving unit includes a receiving circuit connected to a position detector.

6. The controller according to claim 1, wherein said receiving unit includes communication means connected to a servo amplifier.

7. The controller according to claim 1, wherein a plurality of receiving units are provided, respectively receiving different position information, and a plurality of additional receiving units and a plurality of monitoring units are provided for said respective receiving units.

8. The controller according to claim 1, wherein a plurality of receiving units are provided, respectively receiving different position information, and said additional receiving unit and said monitoring unit are commons to said respective receiving units.

9. A controller for performing position control of an industrial machine, comprising:
    a first receiving unit and a second receiving unit receiving position information from a position detector of the industrial machine, said first and second receiving units provided independently of one another and receiving the same position information from the industrial machine; and
    a monitoring unit receiving the position information from the second receiving unit and monitoring the first receiving unit based on the position information received from the second receiving unit.

10. A method for performing position control of an industrial machine, comprising:

transferring position information from a position detector of the industrial machine to a first receiving unit and to a second receiving unit provided independently of the first receiving unit; and monitoring the first receiving unit based on the position information received from the second receiving unit.

* * * * *